UNITED STATES PATENT OFFICE 2,388,259

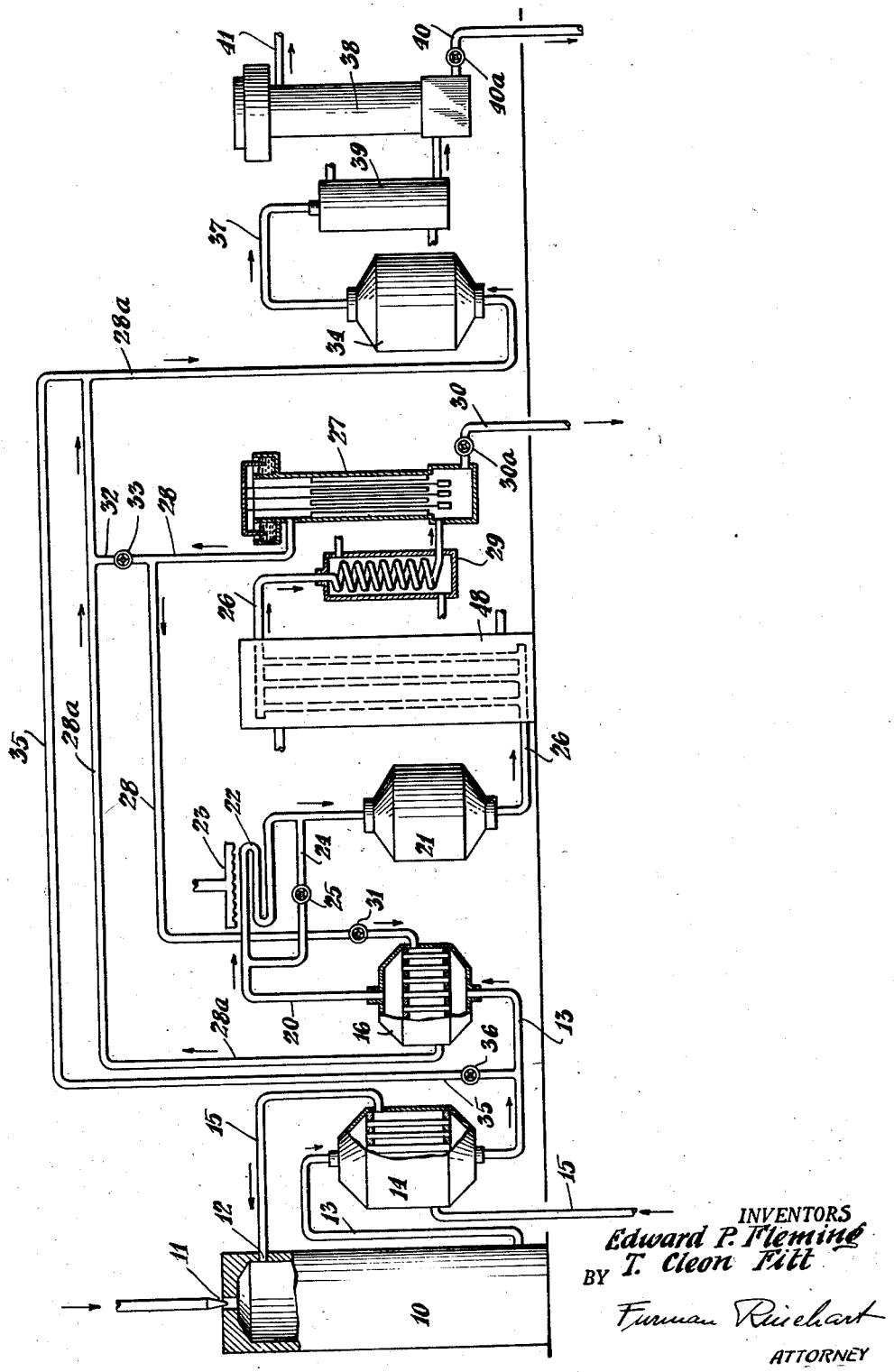

RECOVERY OF SULPHUR FROM GASEOUS MIXTURES

Edward P. Fleming, Los Angeles, Calif., and T. Cleon Fitt, Salt Lake City, Utah, assignors to American Smelting and Refining Company, New York, N. Y., a corporation of New Jersey Application July 17, 1942, Serial No. 451,284

7 Claims. (Cl. 23—226)

This invention relates to the production of sulphur from gaseous mixtures containing sulphur dioxide such as those obtained in various metallurgical operations.

More particularly it relates to the recovery of sulphur by the reduction of sulphur dioxide contained in gases from roasting, smelting and other similar metallurgical operations by the use of a hydrocarbon fuel such as natural gas.

According to the invention, a system is provided whereby the process may be carried out with a control of the various complex chemical reactions to a degree of such high efficiency that brimstone may be produced in large scale operations on an economically sound and commercial basis.

It is known that the gases resulting from the reducing reactions between roaster or smelter gases and a hydrocarbon fuel contain, inter alia, elemental sulphur, sulphur dioxide, hydrogen sulphide, carbon oxysulphide, carbon monoxide and carbon dioxide and that the reactions between some of these compounds at temperatures conducive to the formation of elemental sulphur produce other compounds of sulphur from others and thus tend to defeat the desired object of converting all of the sulphur compounds to elemental sulphur.

In accordance with the invention the roaster or smelter gas is caused to react in a reduction furnace with hydrocarbon fuel such as natural gas at a temperature above 1200° C. for rapid reduction of sulphur dioxide. The gas stream containing the resulting products of the reaction, as mentioned above, is then cooled to about 425°–450° C. and passed into a catalyst chamber containing a suitable catalyst such as bauxite where additional amounts of the sulphur compounds are converted to elemental sulphur. The gas stream is then cooled to about 120° to 140° C. and passed through a sulphur precipitator wherein a substantial quantity of the elemental sulphur is removed. It is necessary to cool the gas stream to precipitate the elemental sulphur but the cooling has the effect of creating a condition opposing the reduction of the sulphur compounds to elemental sulphur. To convert the sulphur compounds and particularly the hydrogen sulphide still contained therein, the gas stream is heated to a temperature of about 200° to 250° C. and passed through a second catalyst chamber containing a suitable catalyst such as bauxite wherein substantially all of the sulphur compounds are converted to elemental sulphur. The gas stream is again cooled to about 120° to 140° C. and passed through a second precipitator wherein substantially all of the elemental sulphur is removed. The residual gas stream then containing only about one per cent or less of sulphur dioxide and hydrogen sulphide by volume is vented to the atmosphere without creating a nuisance.

Inasmuch as the temperature in the second catalyst chamber is sufficiently low to be conducive to the deposition of sulphur upon the catalyst mass and thereby foul it or reduce its effectiveness in aiding the conversion of the sulphur compounds in the gas stream to elemental sulphur, this condition is effectively remedied by passing, from time to time and for short periods, a part of the hot gas stream from the reduction furnace, prior to its entry into the first catalyst chamber, directly into the second catalyst chamber whereby the sensitive heat in the gas stream will raise the temperature in the second catalyst chamber to vaporize the sulphur undesirably deposited on the catalyst mass and thereby purge the second catalyst chamber of the deposited sulphur to reactivate the catalyst. The periods of the purging operation are sufficiently short and of sufficiently infrequent occurrence as to cause no material lessening of the overall efficiency of operation.

Although the novel features which are believed to be characteristic of this invention will be particularly pointed out in the claims appended hereto, the invention itself, as to its objects and advantages, and the manner in which it may be carried out, may be better understood by referring to the following description in connection with the accompanying drawing forming a part thereof in which the single figure shows, in more or less diagrammatical fashion and partly in cross-section, a typical plant for practicing the process of the invention.

Referring to the drawing, 10 represents a reduction furnace which operates on the downdraft principle. It is provided with a natural gas inlet 11 and a raw smelter or roaster gas inlet 12. The furnace is provided with an outlet conduit 13 which leads through a first heat exchanger 14.

A conduit 15 for the raw smelter or roaster gas passes through the heat exchanger 14 in heat interchange relationship with conduit 13.

A conduit 20 leads from the second heat exchanger 16 to a first catalyst chamber 21 charged with a catalyst mass which may be bauxite. The conduit 20 is provided with a trombone cooler 22, the temperature of which may be adjusted by means of spray header 23. An auxiliary conduit 24 in which is a valve 25 provides a by-pass around the trombone cooler 22.

Leading from the first catalyst chamber or converter 21 is a conduit 26 which connects to a first sulphur precipitator 27. This conduit passes through a first gas stream cooler 48 which may, if desired, be in the form of a waste heat boiler and a second gas stream cooler 29 which may, if desired, be in the form of a boiler feed water heater.

The sulphur precipitator 27, which may be of the Cottrell electrical precipitator type, is provided with a draw-off pipe 30 and valve 30a. Leading from the first sulphur precipitator 27 is a gas stream conduit 28 connecting with second heat exchanger 16 in heat interchange relationship with conduit 13—20. The gas stream conduit 28 is provided with a valve 31 and continues from the second heat exchanger 16. The conduit from secondary heat exchanger 16 is designated by reference character 28a. Conduit 28—28a is provided with an auxiliary conduit 32 in which is a valve 33 which provides a by-pass around heat exchanger 16. Conduit 28a leads into a second catalyst chamber or converter 34 charged with a catalyst mass which may be bauxite.

A conduit 35 connects with conduit 13 at a locus preferably between the first or primary gas heat exchanger 14 and the second or secondary gas heat exchanger 16. This conduit connects with the gas stream conduit 28a and is provided with a valve 36.

Leading from the second catalyst chamber 34 is a conduit 37 which connects with a second sulphur precipitator 38 similar to sulphur precipitator 27 and passes through a gas cooler 39 similar to gas cooler 29. Sulphur precipitator 38 is provided with a pipe 40 and valve 40a to draw off sulphur. A vent 41 permits residual gas from the system to pass to the atmosphere.

All the units in the system are provided with the usual and conventional cleanouts, drains, valves, pumps, etc., not shown as they are known to those skilled in the art.

In one manner of operation of a plant constructed in accordance with the invention, raw gas which may be smelter or roaster gas which contains 7% to 8% sulphur dioxide is forced continuously through conduit 15 into the reduction furnace 10. A proper amount of natural gas is continuously introduced into the furnace through the inlet 11 to reduce the sulphur dioxide. A temperature should be maintained in the furnace which will be conducive to rapid reduction. Excellent results have been obtained by maintaining a temperature in the reduction furnace above 1200° C. and preferably in the neighborhood of 1200° to 1250° C. although this temperature may be varied some without too serious effect. We prefer to introduce natural gas in an amount which corresponds to about 9.5%–10% by volume of the smelter gas passing into the furnace to obtain the desirable balance. Ordinarily the gases treated in our operations have contained 7%–8% sulphur dioxide and also sufficient residual oxygen (of the order of 10%) so that the introduction of air into the reduction furnace with the natural gas is unnecessary. However, when the grade of smelter gas increases, say to 10% sulphur dioxide, the percentage of oxygen contained in it may be diminished to an extent where we introduce air and natural gas into the reduction furnace in proper proportions to maintain the desired combustion.

The hot gases leaving the furnace will tend to cool as they leave the furnace through the conduit 13 and will reach the primary heat exchanger 14 at about 1100° to 1125° C. if an average temperature of about 1250° C. is maintained in the furnace. The gas stream leaving the furnace through conduit 13 will pass through the primary heat exchanger 14 in heat interchange relationship with the raw gas passing toward the reduction furnace through conduit 15.

This primary gas heat exchanger performs a duo-fold function. The gas stream leaving the furnace at about 1100° C.–1125° C. and entering this heat exchanger is cooled to the neighborhood of 700° C. and the raw gas passing into the furnace is raised from atmospheric temperature up to about 700° C. By so preheating the raw gas it is possible to return a very substantial amount of heat to the furnace, thus materially speeding up combustion and increasing the capacity of the furnace.

The gas stream leaving the primary heat exchanger 14 is then passed into a secondary gas heat exchanger 16 through the conduit 13 into heat transfer relationship with the gas stream from another part of or step in the system, described hereinafter. The gas stream will be further cooled in the secondary exchanger 16 to the neighborhood of 450° C.

A smaller cooler 22 of the trombone type is provided in the conduit 20 leading from secondary heat exchanger 16 to first catalyst chamber or converter 21. By regulating the by-pass valve 25 in by-pass conduit 24, the temperature of the gas stream entering the first converter 21 may be very accurately controlled.

The temperature of the gas stream is adjusted so as to maintain a temperature in the first converter conducive to the conversion of carbon oxysulphide, which is invariably present in the gas stream. Preferably, a temperature in the neighborhood of 425° to 450° C. is maintained in this converter, although it will be understood that in a plant of commercial proportions where a gas stream is moving and complex chemical reactions are taking place, some of which are reversible, the temperature may vary somewhat and a variation up or down of 25° or so from time to time is not uncommon.

As pointed out hereinbefore, the first converter or catalyst chamber 21, as well as the second converter 34, contains a suitable catalyst such as bauxite. The gas stream leaving the first converter will contain a substantial quantity of elemental sulphur in the form of vapor, also hydrogen sulphide and other compounds of the reactions. It is passed from converter 21 through conduit 26 into a first gas cooler 48 which may be a waste heat boiler and then through a second gas cooler 29 which may be in the form of a feed water heater. The first gas cooler 48 will reduce the temperature of the gas stream substantially and the second gas cooler is operated to control the temperature of the gas stream to below 150° C. and preferably at about 125° C. when it enters the first sulphur precipitator 27. This sulphur precipitator is of the well-known type of Cottrell electrical precipitator. By maintaining the temperature of the gas stream at this point at about 125° C., elemental sulphur in the gas stream may be precipitated as a liquid and may be drawn off through the pipe 30a.

The gas stream leaving the first precipitator and then stripped of a substantial quantity of the elemental sulphur is passed through conduit 28 and a part of it through secondary gas heat exchanger 16 in heat interchange relationship with the gas stream in conduit 13 where the temperature of the gas stream from the first sulphur precipitator is raised to approximately 300° C.

Inasmuch as it is desired to introduce the gas stream into the second converter 34 at a temperature conducive to conversion of the sulphur compounds still remaining in it, preferably at about 225° C., the by-pass valve 33 in auxiliary conduit 32 is opened and regulated to permit sufficient of the relatively cool gas in conduit 28 to pass directly into conduit 28a so that the gas stream entering the second converter 34 may be closely controlled. The reaction in the converter is exothermic and the temperature in the converter is maintained at from 225° to 250° C. and preferably at about 225° C. This may be effectively controlled by regulation of valve 33, or valve 31, or both.

Substantially all of the sulphur compounds then in the gas stream are converted to elemental sulphur in the second converter 34. The gas stream is then passed through conduit 37 through a third and final gas cooler, which may be in the form of a feed water heater, where the temperature of the gas stream is reduced to a temperature below 150° C. and preferably to about 120°–125° C.

The gas stream is then passed through the second sulphur precipitator which may be of the same type as precipitator 27. Substantially all of the sulphur in the gas stream is precipitated out and may be drawn off as a liquid through a draw-off pipe 40a.

The residual gas containing only minor quantities of sulphur dioxide and hydrogen sulphide, the combined amounts being of the order of one per cent or less by volume, is then permitted to escape to the atmosphere through vent stack 41.

Inasmuch as a substantial part of the elemental sulphur in the gas stream has been removed in the first sulphur precipitator, the second converter is very effective in converting substantially all of the sulphur compounds still in the gas stream to elemental sulphur when a temperature of 225° C. to 250° C. is maintained in the second converter. This is probably due in part at least to the effect of the laws of mass action. But, in any event, the high conversion of the sulphur compounds in the raw gas to brimstone is evident from the fact that the residual gas vented to the atmosphere contains no more sulphur dioxide and hydrogen sulphide than an amount of the order of one per cent or less.

However, the temperature normally maintained in the second converter is sufficiently low to cause some precipitation of elemental sulphur upon the contact or catalytic mass and thus foul it or render it ineffective for efficient conversion. But this fouling of the catalytic mass in the second converter necessarily incident to the operation of the system at temperatures to produce the highest conversion is very readily and easily remedied by utilizing the sensible heat from the hot gas stream soon after it leaves the furnace. By opening valve 36 in the conduit 35 a sufficient amount of the hot gas stream, preferably at about 700° C., may pass through this conduit and be introduced directly into the second converter 34 by by-passing the intermediate units of the plant. The valve 36 is regulated so that enough of the hot gas stream taken from conduit 13 will bring the temperature of the second converter to about 450° C. If the temperature in the second converter is thus raised to about 450° C. by the sensible heat in the gas stream, the sulphur deposited on the catalytic mass will be speedily and effectively vaporized and pass out of the converter with the gas stream and thereby purge the fouled mass of deposited sulphur and reactivate it. Valve 36 may be then closed and the plant returned to normal operating conditions. This purging or "cooking out" will be of sufficiently short duration and of sufficiently infrequent occurrence that there will not be any material lessening of the overall efficiency of the system over extended periods of operation.

While certain novel features of the invention have been disclosed herein, and are pointed out in the annexed claims, it will be understood that various omissions, substitutions and changes may be made by those skilled in the art without departing from the spirit of the invention.

What is claimed is:

1. The process for treating sulphur dioxide-bearing gases to recover sulphur therefrom which comprises reacting the sulphur dioxide-bearing gases with a reducing gas at a temperature above 1200° C. thereby yielding a hot gas stream, cooling said hot gas stream to about 400–450° C. by heat exchange with (a) incoming sulphur dioxide-bearing gases and (b) stripped gas from a first electrical precipitation step, passing the cooled gas stream in contact with a first mass of catalyst, cooling the gas stream from said first catalytic mass to under 150° C. and then subjecting it to a first electrical precipitation step thereby recovering sulphur and yielding a stripped gas stream, heating the stripped gas stream by passing same in heat exchange relationship to the hot gas stream as aforesaid, conducting the heated stripped gas stream in contact with a second mass of catalyst, cooling the gas stream from said second catalytic mass to under 150° C. and then subjecting it to a second electrical precipitation step thereby recovering additional sulphur and yielding a discard gas stream.

2. The process for treating sulphur dioxide-bearing gases to recover sulphur therefrom which comprises burning the sulphur dioxide-bearing gas with natural gas to yield a hot gas stream, cooling said hot gas stream by heat exchange with (a) incoming sulphur dioxide-bearing gas and (b) stripped gas from a first electrical precipitation step, passing the cooled gas stream in contact with a first mass of catalyst at a temperature of 425–450° C.±25°, cooling the gas stream from said first catalytic mass to under 150° C. and then subjecting it to a first electrical precipitation step thereby recovering sulphur and yielding a stripped gas stream, heating the stripped gas stream by passing sufficient of it in heat exchange relationship to the hot gas stream as aforesaid to impart a temperature of about 200–250° C. to the gas stream as a whole, conducting the so-heated stripped gas stream in contact with a second mass of catalyst, cooling the gas stream from said second catalytic mass to under 150° C. and then subjecting it to a second electrical precipitation step thereby recovering additional sulphur and yielding a discard gas stream.

3. The process for treating metallurgical gases and the like containing sulphur dioxide to recover sulphur therefrom which comprises reacting same with natural gas at a temperature above 1200° C. to yield a hot gas stream, cooling said hot gas stream by heat exchange with a stripped gas stream from a first sulphur separation step, passing the cooled gas stream through a first mass of catalyst, cooling the gas stream from said first catalytic mass to under 150° C. and subjecting the resulting cooled gas stream to a first sulphur separation step thereby recovering sulphur and yielding a stripped gas stream, adjusting the temperature of said stripped gas stream to 200–250° C. by passing a portion of same in heat exchange relationship to the hot gas stream as aforesaid and by-passing said heat exchange step with the other portion, combining the said portions and conducting the resulting gas stream through a second mass of catalyst, cooling the gas stream from said second catalytic mass to about 120–140° C. and subjecting the resulting cooled gas stream to a second sulphur separation step thereby recovering additional sulphur and yielding a discard gas stream.

4. The process for treating sulphur dioxide-bearing gases such as smelter gases and the like to recover sulphur therefrom which comprises reacting the sulphur dioxide-bearing gas with natural gas at a temperature above 1200° C. thereby yielding a hot gas stream, cooling said hot gas stream to about 400–450° C., passing the cooled gas stream through a first catalytic mass, cooling the gas stream from said first catalytic mass to about 120–140° C. and subjecting it to a first electrical precipitation step thereby recovering sulphur and yielding a stripped gas stream, heating said stripped gas stream to about 200–250° C., conducting the heated stripped gas stream through a second catalytic mass, cooling the gas stream from said second catalytic mass to about 120–140° C. and subjecting it to a second electrical precipitation step thereby recovering additional sulphur and yielding a discard gas stream, and purging said second catalytic mass of deposited sulphur from time to time by a hot gas stream diverted at a locus anterior of said first catalytic mass and passed directly through said second catalytic mass, whereby deposited sulphur is vaporized and swept from said second catalytic mass by the hot gas stream.

5. The method of producing sulphur from roaster or smelter gas or the like which comprises introducing measured quantities of said gas heated to a temperature in the neighborhood of 600°–700° C. together with sufficient measured quantities of natural gas into a reaction chamber whereby to maintain therein a temperature in the neighborhood of 1200°–1300° C. and cause a reducing reaction to convert sulphur dioxide to elemental sulphur, passing the resulting gas stream through a first heat exchanger in heat interchange relation with the raw roaster or smelter gas introduced into said reaction chamber to raise the temperature of the raw gas to the neighborhood of 600°–700° C. and to reduce the temperature of said gas stream from the reaction chamber, then passing said gas stream in heat interchange relation to further cool same to the neighborhood of 450° C., then passing said gas stream through a first catalyst chamber in contact with a catalyst mass whereby to accelerate further reduction of sulphur dioxide, then reducing the temperature of said gas stream to below 130° and passing same through a first precipitator to precipitate sulphur from said gas stream thereby forming a stripped gas stream, passing a part of the stripped gas stream from said precipitator in heat exchange relationship with said gas stream prior to its introduction into said first catalyst chamber and then combining it with the other part of the stripped gas stream whereby to adjust the temperature of the confluent stripped gas streams to 220°–240° C., then passing the confluent stripped gas stream through a second catalyst chamber in contact with a second catalyst mass to cause further reduction of sulphur dioxide to elemental sulphur, then cooling the gas stream to below 130° C. to facilitate precipitation of sulphur, and then precipitating substantially all of the elemental sulphur in the gas stream.

6. A method of recovering sulphur from metallurgical gas which comprises burning the gas containing a substantial amount of sulphur dioxide with a reducing gas in a reduction furnace maintained at a temperature of above 1200° C. to produce a hot gas stream, passing the hot gas stream in heat exchange relation with incoming metallurgical gas passing into said reduction furnace to preheat the incoming gas and to cool the hot gas stream from the furnace, then further cooling said gas stream to about 425°–450° C., passing the so-cooled gas stream in contact with a first mass of catalyst to speed up the reactions to form elemental sulphur, then cooling the gas stream containing elemental sulphur to about 120°–130° C. to facilitate precipitation of sulphur, then precipitating a substantial part of the elemental sulphur then contained in the gas stream to remove sulphur and to form a stripped gas stream, then passing the stripped gas stream in heat exchange relation with the hot gas stream passing to said first catalyst mass to heat said stripped gas stream, adjusting the temperature of the stripped gas stream to 220°–230° C., then passing said stripped gas stream in contact with a second catalyst mass to form more elemental sulphur in said stripped gas stream, then cooling the gas stream passing from the second catalyst mass to 120°–130° C., and then precipitating from the resulting gas stream substantially all the elemental sulphur contained therein.

7. A method of recovering sulphur from metallurgical gas which comprises burning the gas containing a substantial amount of sulphur dioxide with a reducing gas in a reduction furnace maintained at a temperature of above 1200° C. to produce a hot gas stream, passing the hot gas stream in heat exchange relation with incoming metallurgical gas passing into said reduction chamber to preheat the incoming gas and to cool the hot gas stream from the furnace, then further cooling said gas stream to a temperature of about 425°–450° C., passing the so-cooled gas stream in contact with a first mass of catalyst to speed up the reactions forming elemental sulphur, then cooling the gas stream containing elemental sulphur to about 120°–130° C. to facilitate precipitation of sulphur, then precipitating a substantial part of the elemental sulphur then contained in the gas stream to remove sulphur therefrom and forming a stripped gas stream, then raising the temperature of the stripped gas stream to the neighborhood of 220°–230° C., then passing said stripped gas stream in contact with a second catalyst mass to form more elemental sulphur in said stripped gas stream, then cooling the gas stream to about 120°–130° C., then precipitating from said gas stream substantially all the elemental sulphur contained therein, and clearing said second catalyst of sulphur from time to time with sensible heat contained in said hot gas stream by diverting sufficient of said stream for short periods at a locus anterior of said first catalyst mass and passing same directly into contact with said second catalyst mass to vaporize sulphur deposited thereon and thereby reactivate said second catalyst mass.

EDWARD P. FLEMING.
T. CLEON FITT.